April 21, 1936.  L. S. ROSENER  2,038,238

METHOD AND APPARATUS FOR MAKING LINOLEUM

Filed Oct. 2, 1933  7 Sheets-Sheet 1

INVENTOR.
LELAND S. ROSENER
BY
HIS ATTORNEY

April 21, 1936. L. S. ROSENER 2,038,238
METHOD AND APPARATUS FOR MAKING LINOLEUM
Filed Oct. 2, 1933 7 Sheets-Sheet 2

INVENTOR.
LELAND S. ROSENER
BY Charles S. Evans
HIS ATTORNEY

April 21, 1936. L. S. ROSENER 2,038,238
METHOD AND APPARATUS FOR MAKING LINOLEUM
Filed Oct. 2, 1933 7 Sheets-Sheet 4

INVENTOR.
LELAND S. ROSENER
BY
HIS ATTORNEY

April 21, 1936.  L. S. ROSENER  2,038,238
METHOD AND APPARATUS FOR MAKING LINOLEUM
Filed Oct. 2, 1933  7 Sheets-Sheet 5

INVENTOR.
LELAND S. ROSENER
BY
HIS ATTORNEY

April 21, 1936.  L. S. ROSENER  2,038,238
METHOD AND APPARATUS FOR MAKING LINOLEUM
Filed Oct. 2, 1933   7 Sheets-Sheet 6

Patented Apr. 21, 1936

2,038,238

UNITED STATES PATENT OFFICE 2,038,238

METHOD AND APPARATUS FOR MAKING LINOLEUM

Leland S. Rosener, San Francisco, Calif., assignor to The Paraffine Companies, Inc., San Francisco, Calif., a corporation of Delaware Application October 2, 1933, Serial No. 691,831

35 Claims. (Cl. 154—26)

My invention relates primarily to the manufacture of inlaid linoleum, and more particularly to that phase of the manufacture which deals with the mounting of the preformed linoleum inserts on a backing sheet or web.

It is among the objects of my invention to provide an improved method and apparatus for laying the linoleum inserts on a web.

Another object of my invention is to provide insert laying apparatus which is characterized by the absence of complex mechanism, and in which both the initial and upkeep costs are comparatively small.

Another object of my invention is to provide a simplified method and apparatus for laying the inserts on the web while the latter is in continuous motion.

Still another object of my invention is to provide apparatus in which the web carrying the loosely laid inserts may be inspected at any time prior to pressing the inserts in their finally laid positions.

A further object of my invention includes the provision, in an apparatus of the character described, of a pressing machine which is convertible into a calendering unit and therefore adaptable for use in conjunction with other types of linoleum.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figures 1a and 1b are diagrammatic views illustrating my improved method of making inlaid linoleum; Figure 1a shows the web and the insert positioning plates in side elevation, and Figure 1b shows the web in plan to illustrate the various stages in the process of laying the inserts.

In terms of broad inclusion, the method of making inlaid linoleum embodying my invention comprises placing a template adjacent a predetermined area of the linoleum web, and positioning preformed inserts upon the web in accordance with the preestablished indicia on the template. For a multiple design a second template is subsequently placed adjacent the same area, and other inserts are positioned upon the web in accordance with the preestablished indicia on the second template. In a similar manner other inserts may be positioned upon the web area, and interfitted with previously laid inserts, until the design configuration formed by the inlays is completed.

The apparatus preferably employed for carrying out the method of my invention comprises a plurality of operating stations, and means for moving the web past the stations. A template for indicating the positions of the inlays is provided at each station, and means operating in time with the web are provided for moving the templates into and out of operating positions at the respective stations.

A machine is also provided for pressing the loosely laid inlays into their final position on the web, and this machine is preferably of a type which may be converted into a calendering unit for use in conjunction with other types of linoleum. An inspection table is also preferably provided between the operating stations and the pressing machine, and at which point any corrections to the design may be made while the inserts are still lying loosely on the web.

In greater detail, and referring particularly to

Figure 2:
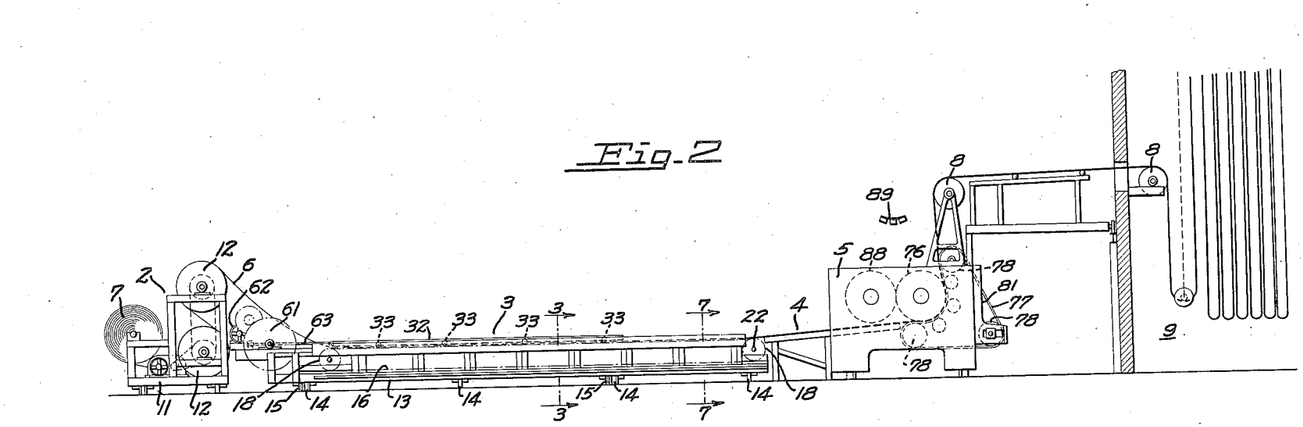
Figure 2 is a side elevational view, largely diagrammatic, showing the operative relationship between the several units comprising the apparatus of my invention.

Figure 2, the linoleum making apparatus embodying my invention comprises an unwinding mechanism 2, a laying-up table 3, an inspection table 4 and a pressing machine 5. These units of the apparatus are preferably mounted for transverse movement on suitable track engaging wheels. The web 6 upon which the linoleum inserts are laid, and which is usually a fabric such as burlap, is unwound from a supply roll 7 by the mechanism 2 and is then fed forwardly over the laying-up table 3.

The linoleum inserts are deposited on the moving web at suitable operating stations provided along the table 3. These inlays may be made of any suitable material, and may be of any desirable color and shape (the latter of course depending upon the design configuration). After leaving the laying-up table 3 the web carrying the loosely applied inlays passes over the inspection table 4. At this point any alterations or corrections in the design may be made. From the table 4 the web passes into the pressing machine 5, in which the inlays are pressed into their finally laid positions. The web then passes over suitable guides 8 into a stove 9 maintained at a temperature suitable for curing the linoleum composition.

Taking up these several units of the apparatus in detail, the unwinding mechanism 2 comprises a frame 11 upon which the supply roll 7 of web material is journalled. A pair of motor driven rolls 12 are provided about which the web 6 is adapted to pass. These rolls by reason of their frictional engagement with the web operate to unwind the latter from the supply roll. From the upper roll 12 the web 6 passes downwardly and over the laying-up table 3.

As best shown in Figures 3 to 7, inclusive, the laying-up table 3 comprises a main frame 13 mounted for transverse movement by track engaging wheels 14. Because of the length of this unit of the apparatus suitable rack engaging gears 15 are provided on the wheel axles. These rack and gear mountings prevent twisting of the table frame when the latter is moved on its tracks, as will be readily understood. The frame 13 provides a mounting for a conveyor 16 comprising a plurality of slats carried between a pair of endless chains 17 running on suitable rails extending longitudinally of the main frame and running over suitable sprockets 18 journalled at the ends of the frame.

Figure 5:
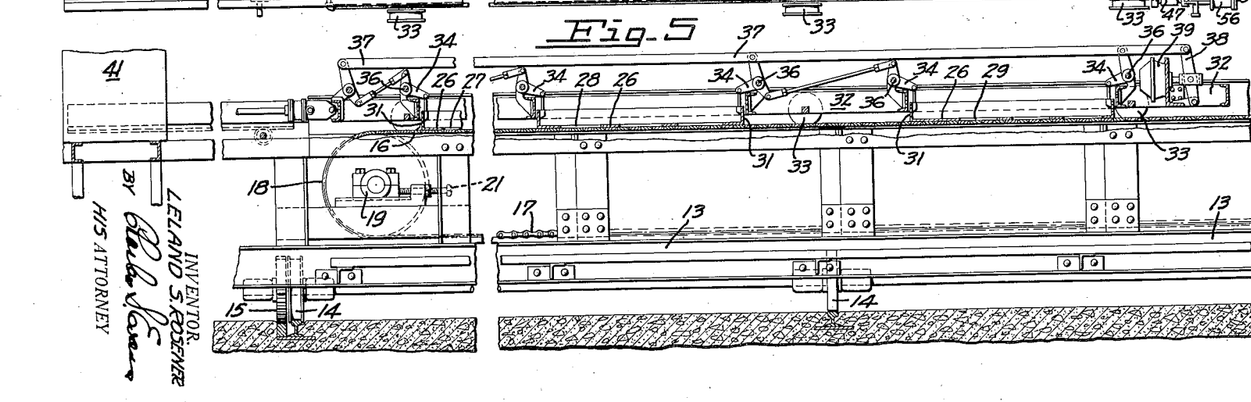
Figure 5 is a longitudinal sectional view of the same.
Figure 6:
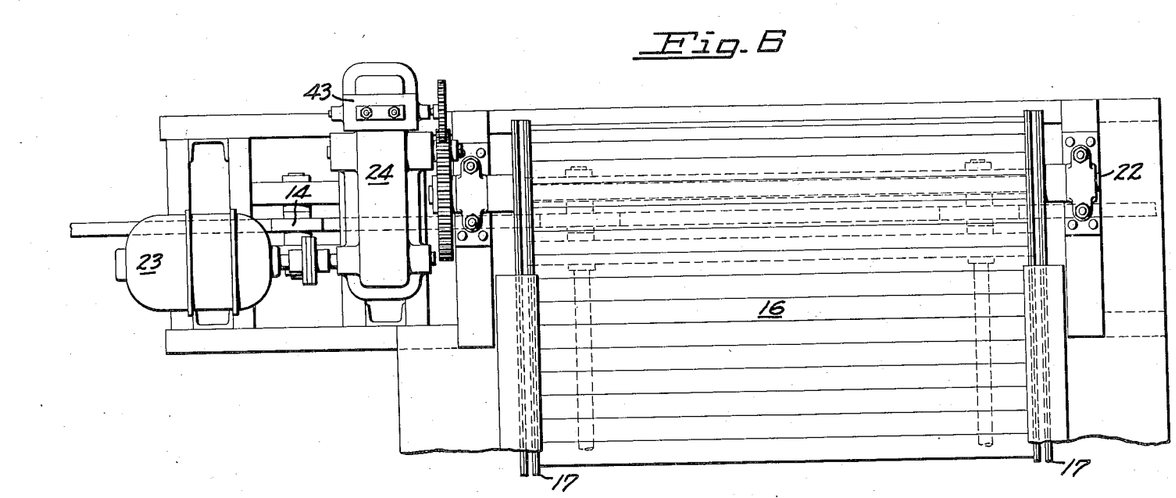
Figure 6 is a plan view of the front portions of the laying-up table, showing particularly the drive mechanism for the table conveyor.
Figure 7:
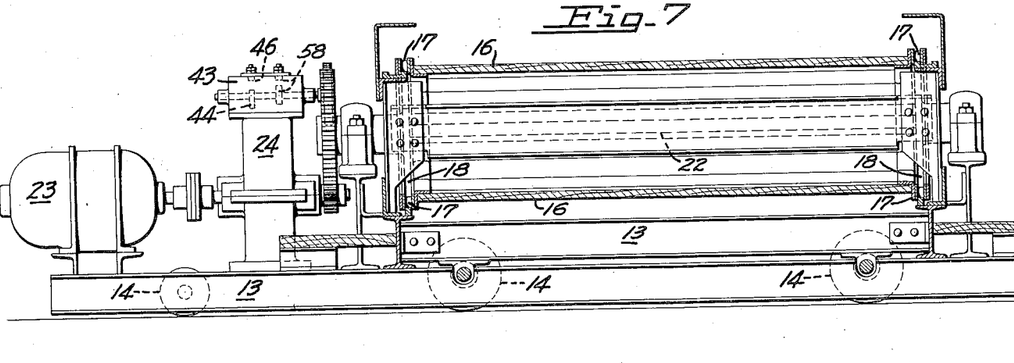
Figure 7 is a transverse vertical sectional view showing the table drive mechanism in side elevation, the plane of section being indicated by the line 7—7 of Figure 2.

The bearings 19 of the rear sprockets are preferably slidably mounted, and an adjusting screw 21 is provided in conjunction with the bearings for tensioning the reaches of the conveyor. Note Figure 5. As best shown in Figures 6 and 7, the shaft 22 carrying the front conveyor sprockets is drivably connected with a suitable motor 23 through a reduction gear 24. When the conveyor is running the upper reach thereof moves from left to right in the view as shown in Figure 2, and provides a moving top for the laying-up table for advancing the web along the table.

The unwinding mechanism 2 preferably operates at substantially the same speed as the conveyor 16, so that the web is laid upon the conveyor at the same rate that it is being fed forwardly along the table. The web on the conveyor therefore lies freely and without stretch or strain.

Figure 1A:
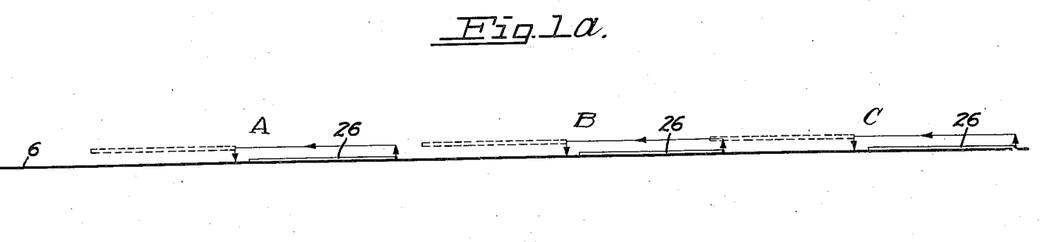
Figure 1B:
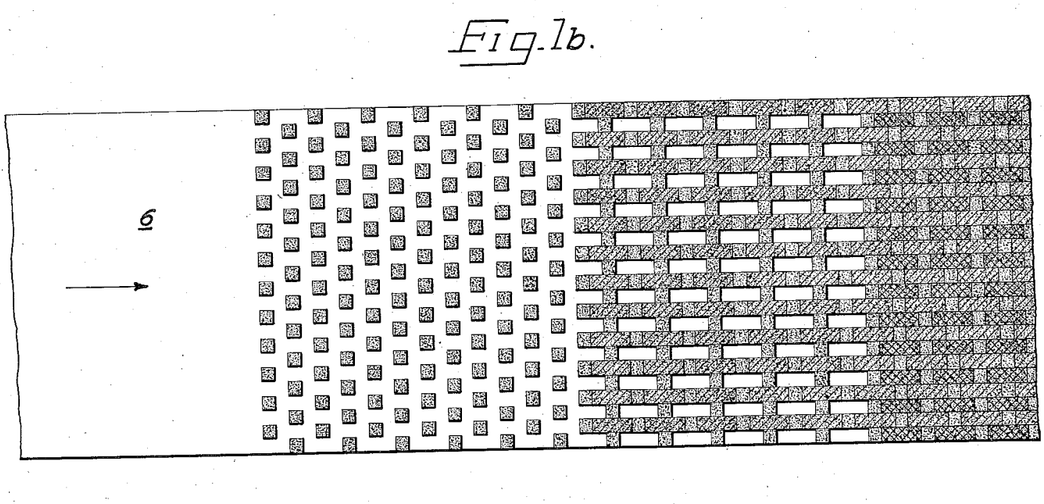

Means are provided for positioning the linoleum inlays on the web as it travels along the table 3. For this purpose a plurality of operating stations are located along the table. These stations are indicated as A, B and C in Figure 1. A suitable template is provided adjacent the web at each station. These templates have pre-established indicia for indicating to the operators the proper positions for the inlays. The templates shown are in the nature of apertured plates 26, but it is understood that this is merely for purposes of illustration as other forms of template are contemplated within the scope of my invention.

Figure 3:
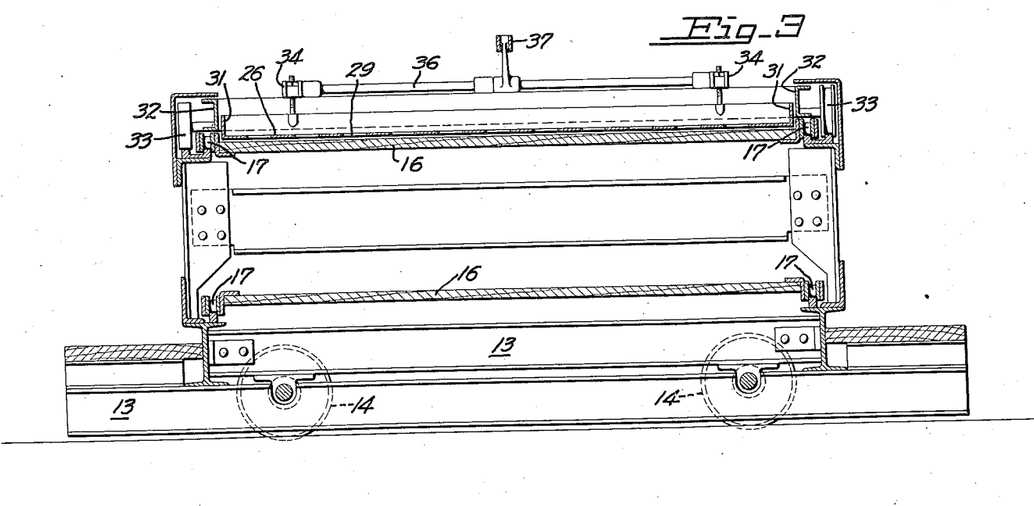
Figure 3 is a transverse vertical sectional view of the laying-up table, taken in a plane indicated by the line 3—3 of Figure 2.
Figure 4:
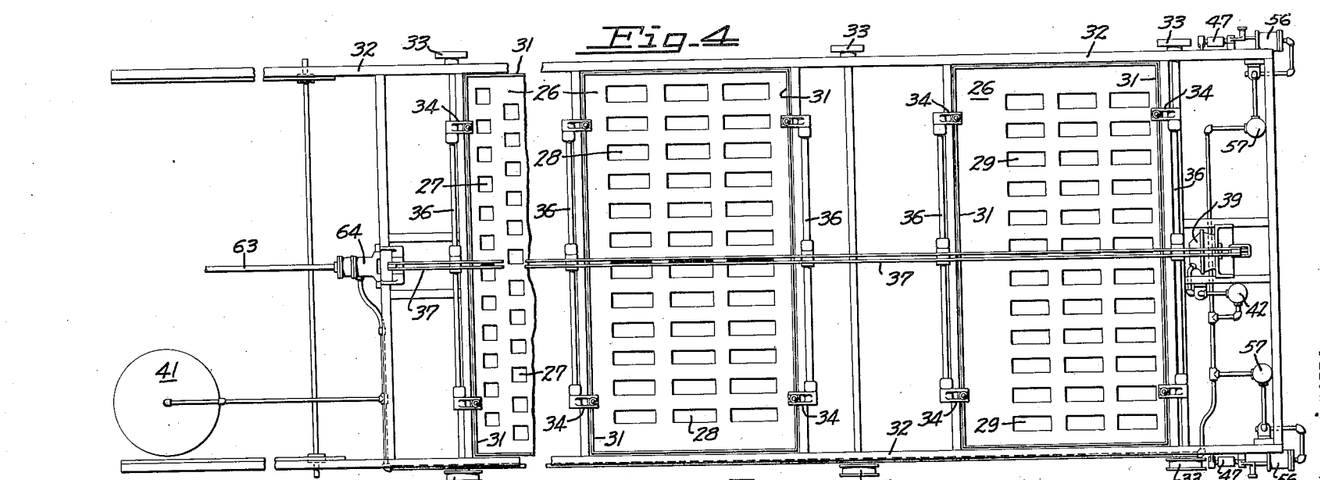
Figure 4 is a plan view showing portions of the laying-up table.

The plates 26 are adapted to ride on the web, and have apertures 27, 28 and 29 (note Figure 4) through which the inlays may be inserted to lie upon the web. The mounting of the plates is best shown in Figures 3, 4 and 5. Here it will be observed that the edges of the plates are provided with flanges 31, so that the plates are in effect in the nature of trays. The trays overlie the conveyor 16, and are mounted on a movable frame 32 having rollers 33 riding on suitable tracks extending longitudinally of the main frame. The trays are suspended by arms 34 carried on cross shafts 36 journalled on the movable frame.

The shafts 36 are connected for rotation together by a bar 37 extending longitudinally of the table. By this construction longitudinal movement of the bar 37 effects a simultaneous movement of the trays into or out of engagement with the web on the conveyor. Movement of the bar 37 is effected by a lever 38 connected with the diaphragm of an air chamber 39. Compressed air from a suitable supply tank 41 is admitted to the chamber 39 through a suitable solenoid operated three-way valve 42.

Means connected for movement with the conveyor 16 is provided for operating the valve 42. This is effected by connecting the valve solenoid in circuit with a rotary contactor 43 mounted for rotation with the conveyor shaft 22. A cam like element 44 is carried on the shaft of the contactor and is positioned to engage a terminal element 46 on the housing of the contactor. These elements are connected, together with a suitable source of current, in circuit with the valve solenoid.

When the circuit is closed by the element 44 moving into engagement with the element 46 the solenoid becomes energized to open the valve 42 and admit air into the chamber 39. This operates to move the bar 37 toward the right as shown in Figure 5 and to lift the trays upwardly and out of engagement with the web. The trays are thus held suspended above the web until the contactor brush 44 moves out of engagement with the terminal 46. When the latter happens the valve 42 is opened to exhaust the air from the chamber 39. The weight of the trays then causes the latter to drop down on the web.

Figure 10:
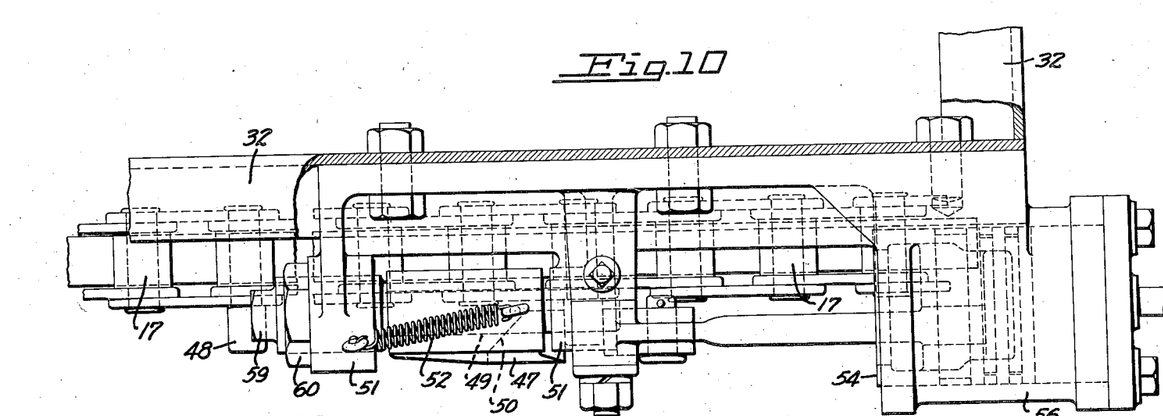
Figure 10 is a fragmentary plan view showing details of the mechanism which locks the insert positioning plates for movement with the table conveyor.
Figure 11:
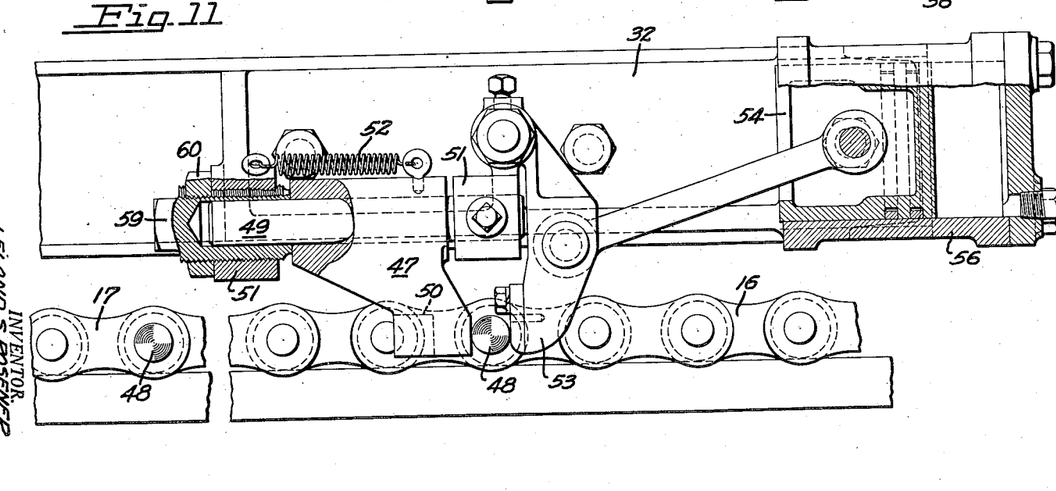
Figure 11 is a side elevational view of the same.

Means are provided for advancing the plates or trays 26 through the stations in time with the forward movement of the web. This is accomplished by locking the tray holding frame 32 for movement with the chains 17 of the conveyor 16. The locking mechanism is best shown in Figures 10 and 11. A lug 47 is mounted on the side of the movable frame 32, and is positioned to project downwardly alongside the conveyor chain 17 between spaced pins 48 extending outwardly from the chain. The lug 47 is mounted on a shaft 49 journalled in suitable bearings 51. This provides a pivot mounting for the lug and adapts the same to swing in and out between the chain pins 48. A spring 52 is provided for urging the lug inwardly between the pins, and a bevel 50 is provided on the back of the lug to assist the same in climbing over the pins when the frame 32 is moved backwardly relative to the conveyor.

A finger 53 is pivotally mounted on the frame 32 and is adapted to project downwardly alongside the chain 17 and bear against the side of the pin opposite the lug 47. In other words, this device provides a clamp for engaging one of the pins 48; the lug 47 and finger 53 providing the jaws of the clamp. The finger 53 is connected to the piston 54 of an air cylinder 56. When compressed air is admitted to the cylinder the finger 53 is driven forwardly against a pin 48. When the air is exhausted from the cylinder the clamp is released and the finger 53 is free to ride up over the pin.

Referring again to Figure 4, it will be seen that air is admitted to the cylinders 56 through a pair of three-way valves 57. These valves are also solenoid operated, and the solenoids of these valves are connected in circuit with another pair of elements 58 provided on the contactor 43. This electrical control times the operation of the clamps with the travel of the web, as will be readily understood. The timing of the mechanisms is such that the plates 26 are locked for movement with the conveyor prior to the time when the plates are lowered into engagement with the web and until after the plates have been lifted from the web. In this way there is no relative lateral movement between the plates and web when the former move into and out of engagement with the latter.

Means are provided for adjusting the plates relative to the web. This is effected by a screw 59 threaded into the rear bearing 51 of the lug shaft 49. The screw bears against the rear end of the lug and operates to shift the latter along its shaft. A lock nut 60 operates to hold the screw in a selected position of adjustment. The pins 48 are spaced along the chains 17 at intervals calculated to bring the plates 26 into proper registration with the design being applied on the web. Adjusting screw 59 of course provides means for taking up wear and maintaining the proper relation between the parts.

Figures 8, 9:
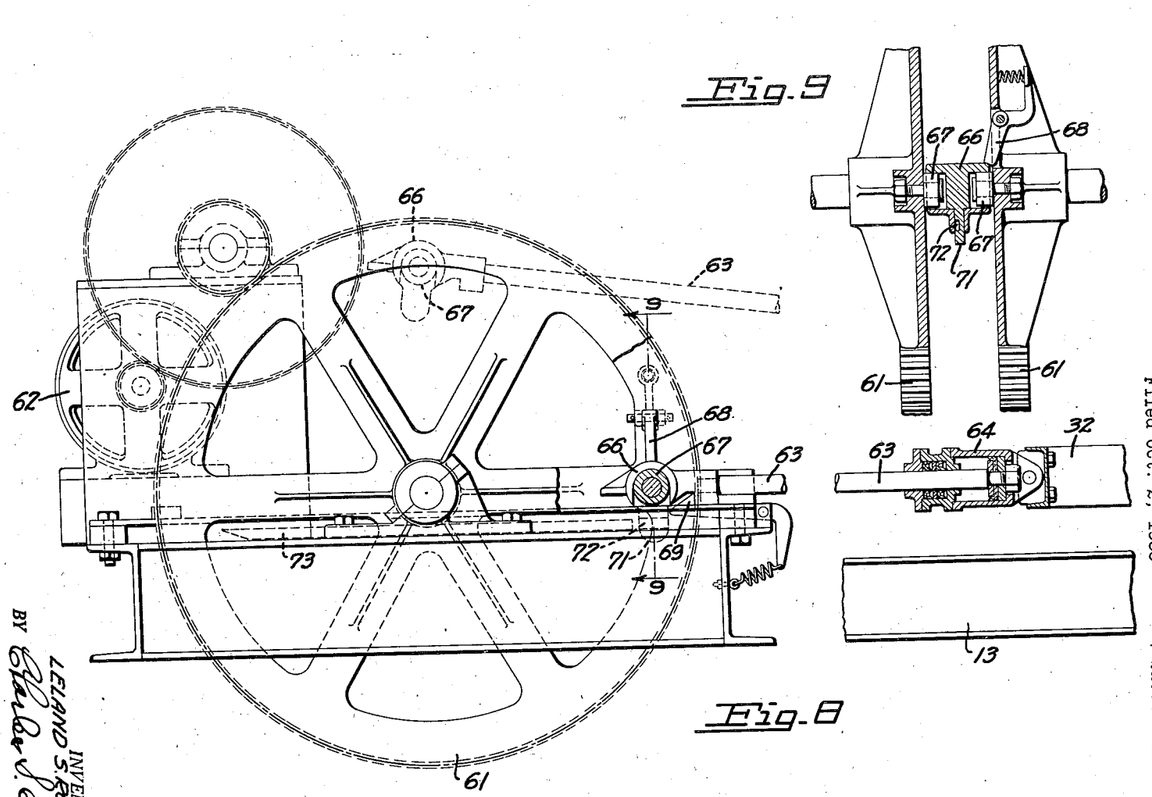
Figure 8 is a detail view showing the principal elements of the shifting mechanism for the insert positioning plates.
Figure 9 is a sectional detail of the same taken in the plane indicated by the line 9—9 of Figure 8.

Means are provided for returning the plates to the head end of the stations. This is accomplished, as best shown in Figures 8 and 9, by a bull wheel 61 geared to a suitable motor 62. The wheel 61 comprises two sections, as shown in Figure 9, between which a connecting rod 63 is adapted to work. One end of the connecting rod is secured to the movable tray frame 32 through a pneumatic shock absorber 64. The other end of the connecting rod is provided with a yoke-piece 66 engagable over a pair of rollers 67 carried by the sections of the wheel 61.

Starting from the position shown in Figure 8, and with the wheel rotating counter clockwise, it will be seen that the connecting rod will be carried backwardly through a one-half revolution of the wheel. After this half revolution the rollers 67 will ride out of engagement with the yoke 66. The wheel is then free to revolve independently of the connecting rod until some later time when the rod yoke 66 will be in a position to again be picked up by the rollers 67.

This plate recovery mechanism is timed with the movement of the web so that the plates are locked for movement with the conveyor subsequent to the time when the wheel frees itself from the connecting rod. As the plates move forwardly with the conveyor the connecting rod yoke moves forwardly across the diameter of the wheel. The timing of the mechanism is such that the connecting rod is again picked up by the wheel following the elevation of the plates above the web It is preferred to effect the recovery movement of the plates rapidly. To accomplish this result the wheel 61 preferably revolves several, say four and one-half, times between each engagement of the connecting rod. In order to prevent the yoke 66 from jumping out of engagement with the rollers 67, a spring pressed catch 68 is preferably provided to engage over the yoke. As best shown in Figure 9 the catch 68 is provided with a rounded end seated against the edge of the yoke 66, so that the catch will be pressed outwardly against the action of its spring and ride down past the yoke as the catch and driving pin 67 are carried down by the bull wheel 61. At the time the yoke is again picked up by the bull wheel, the catch is pressed out of the way by the yoke until the latter engages the driving pin 67, whereupon the latch snaps in over the edge of the yoke where the pressure of the spring is sufficient to prevent the yoke from jumping out of the driving pin. Another spring pressed catch 69 is also provided to hold the connecting rod against backward movement in the position shown in Figure 8. A depending lip 71 is also provided on the yoke 66. This lip is provided with a longitudinally extending groove 72 engageable with a bar 73 provided on the main frame 13. These interengaging members serve to hold the end of the connecting bar against vertical movement as it travels forwardly between the sections of the wheel.

In the operation of the apparatus embodying my invention, a plurality of workmen stand on the opposite sides of the laying-up table 3 at the several operating stations A, B and C. Note Figure 1. As a predetermined area of the web enters the first operating station A, the first apertured plate 26 starts moving forwardly with it. The plate is lowered against the web at the head end of the station, rides on the web through the station and is lifted from the web at the terminal end of the station.

During the time that the plate is riding on the web the workmen standing on opposite sides of the laying-up table place the preformed linoleum inserts on the web and in the openings provided by the plate apertures 27. When the plate is lifted the inlays are of course left on the web and in the positional relationship defined by the plate apertures. In the linoleum design chosen for purposes of illustration these first laid inserts are square shaped, as clearly shown in the lower portion of Figure 1.

The web continues its movement, and when this same area enters the head end of operating station B the second plate 26 moves into engagement over the web area and rests on the square inserts laid at station A. The apertures in this plate are rectangular and cover the parts of the web between the squares of alternate rows, as clearly shown in the lower part of Figure 1. As the second plate rides through station B the workmen insert the inlays in the openings provided by the apertures 28.

In a similar manner the plate in station C rides upon the same area of the web. This last plate is provided with apertures 29 covering the remaining rectangular areas between the squares of alternate rows in the design. The laying of inlays on the web and in the openings provided by these plate apertures operates to completely fill in the design, as clearly shown in the lower part of Figure 1.

It will thus be seen that the method of laying the inlays on the web comprises feeding the web to an operating station; lowering an apertured plate against a predetermined area of the web and advancing the plate with the web while the area is passing through the station, the plate apertures providing openings through which inlays may be inserted to lie upon certain parts of the web area; placing inlays on the web at the station and in the openings provided by the plate apertures; feeding the web forwardly to advance the predetermined area to a second operating station; lowering another apertured plate against the area of the web and advancing the plate with the web while the area is passing through the second station, the apertures of the second plate providing openings through which other inlays may be inserted to lie upon other parts of the web area; and then placing inlays on the web at the second station and in the openings provided by the second plate apertures.

After the web leaves the laying-up table 3 it passes over the inspection table 4. Note Figure 2. The provision of this unit in the apparatus permits the web carrying the inserts to be inspected and any corrections to the design made while the inserts are still loose and prior to their being pressed into their finally laid positions.

Figure 12:
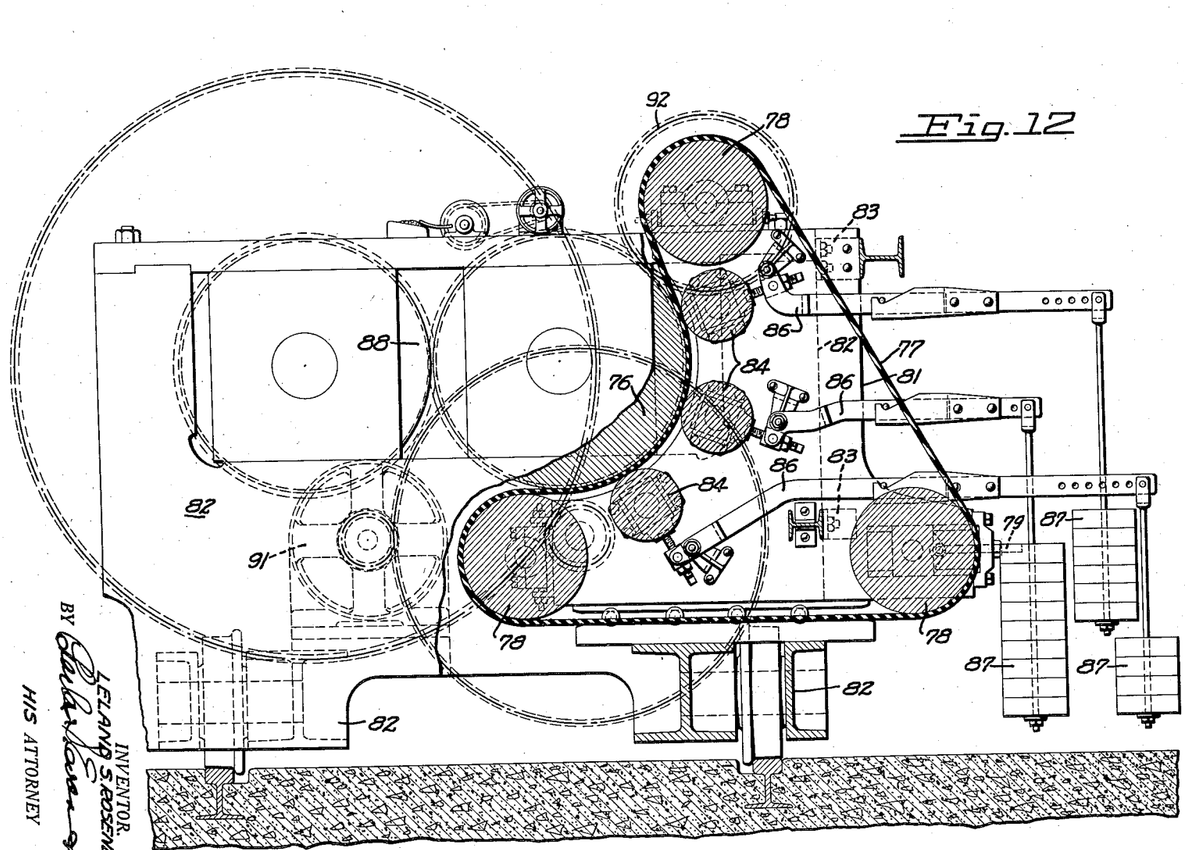
Figure 12 is a side elevational view showing details of the pressing machine; portions of the mechanism being shown in vertical section to illustrate the construction more clearly.

After leaving the inspection table the web passes through the pressing machine 5. As best shown in Figure 12, this unit of the apparatus comprises a roller 76 about which the web passes. A pressure belt 77 is provided to extend about portions of the roller 76. This belt passes over a plurality of guide rollers 78, one of which may be adjustably positioned by a screw 79 for tensioning the belt. The belt is carried by a frame 81 movably mounted on the main frame 82 of the machine, and suitable bolts 83 are provided for holding frame 81 in its operating position with the belt against the roller 76. By removing these bolts the belt carrying frame may be retracted or backed away from the roller.

Means mounted on the frame 81 are provided for pressing the belt against the roller 76. To this end a plurality of rolls 84 are provided for bearing against the belt, and are supported by a plurality of pivotally mounted arms 86 carrying at their outer ends a plurality of adjustable weights 87. By this arrangement the pressure against the linoleum may be varied within wide limits.

The purpose of mounting the pressure belt 77 for movement to and away from the roll 76 is to make the present described unit of my apparatus adaptable for use in conjunction with other types of linoleum. A second roller 88 is provided along side the roller 76. These rollers now provide a pair of calender rolls between which a web may be fed together with a linoleum composition for making ordinary plain linoleum. In this case the composition material is preferably fed between the rolls from a suitable conveyor 89 positioned above the rolls. Note Figure 2. This conveyor is preferably in the nature of a shuttle conveyor which moves back and forth across the length of the rolls to uniformly apply the material. In the making of the plain linoleum the coated web passes around the calender roll 76 and up over the guide rollers 8 and into the stove 9 in the usual manner. The rolls 76 and 88 are geared together and to a drive motor 91. The upper belt roll 78 is provided with a gear 92 which is adapted to mesh with the gear of the roll 76 when the web is forward and in the operating position. This gear ratio is such that the belt speed is substantially equal to the peripheral speed of the roller 76.

I claim:

1. In apparatus for the placing of inlays upon a web, a template for indicating the position of the inlays thereon, means for continuously moving the web, and means for advancing the template with the web.

2. In apparatus for the placing of inlays upon a web, a template for indicating the position of the inlays thereon, means for moving the web continuously in one direction, and means for reciprocating the template in time with the web.

3. In apparatus for the placing of inlays upon a web, a template for indicating the position of the inlays thereon, means for moving the web, means for locking the template for movement with the web, moving means, means for unlocking the template from said moving means, and means for effecting a recovery movement of the unlocked template.

4. In apparatus for the placing of inlays upon a web, a template for indicating the position of the inlays thereon, a conveyor for moving the web, means for locking the template for movement with the conveyor, means for unlocking the template from said conveyor, and quick-acting means for effecting a recovery movement of the unlocked template.

5. In apparatus for the placing of inlays upon a moving web, a template disposed adjacent the web for indicating the position of the inlays thereon, means for advancing the template with the web, and means for moving the template into and out of engagement with the web while the template is advancing.

6. In apparatus for the placing of inlays upon a web, means for supporting the web, a template disposed adjacent the web for indicating the position of the inlays thereon, means for moving the template into and out of engagement with the web, means for advancing the template with the web while in engagement therewith, and means for effecting a recovery movement of the template while out of engagement with the web.

7. In apparatus for the placing of inlays upon a web, a conveyor for moving the web, a template disposed adjacent the web for indicating the position of inlays thereon, and means for locking the template for movement with the conveyor.

8. In apparatus for the placing of inlays upon a web, a conveyor for moving the web, a template disposed adjacent the web for indicating the position of inlays thereon, means for locking the template for movement with the conveyor, and means timed with the movement of the conveyor for actuating said locking means.

9. In apparatus for the placing of different groups of inlays upon a web, a separate template for indicating the position of each group, means for moving the web, and means for advancing the templates with the web.

10. In apparatus for the placing of different groups of inlays upon a web, a separate template for indicating the position of each group, means for continuously moving the web, and means for reciprocating the templates in time with the web.

11. In apparatus for the placing of different groups of inlays upon a web, a separate template for indicating the position of each group, means for moving the web, and means for simultaneously advancing the templates with the web.

12. In apparatus for the placing of different groups of inlays upon a moving web, a separate template for indicating the position of each group, means mounting the templates for advancing movement with the web, and means for successively registering the templates with a predetermined area of the web.

13. In apparatus for the placing of different groups of inlays upon a web, a separate template for indicating the position of each group, means for moving the web, means for advancing the templates with the web and means for timing the operation of said moving means to successively register the templates with a predetermined area of the web.

14. In apparatus for the placing of inlays upon a moving web, a plurality of plates having apertures through which inlays may be inserted to lie upon the web, means mounting the templates for advancing movement with the web, and means for successively registering the templates with a predetermined area of the web, one plate having apertures arranged to position inlays on certain parts of said area and another plate having apertures arranged to position inlays on other parts of said area.

15. The method of laying linoleum inlays on a continuously moving web, which comprises placing a template adjacent the web, advancing the template with the web, and while the template is moving with the web positioning inlays upon the web in accordance with the preestablished indicia on the template.

16. The method of laying linoleum inlays on a continuously moving web, which comprises placing the template on an area of the web, advancing the template with the web, while the template is moving with the web positioning inlays upon the web in accordance with the preestablished indicia on the template, and then removing the template to a new area.

17. The method of laying linoleum inlays on a continuously moving web, which comprises placing the template on an area of the web, advancing the template with the web, while the template is moving with the web, positioning inlays upon the web in accordance with the preestablished indicia on the template, removing the template to a new area, placing a second template on the first mentioned area, advancing said second template with the web, and while the second template is moving with the web positioning other inlays upon the web in accordance with the preestablished indicia on the second template.

18. In apparatus for the placing of inlays upon a web, an operating station, a template at the station for indicating the position of inlays on the web, means for feeding the web continuously past the station, and means for pressing the inlays against the web.

19. In apparatus for the placing of inlays upon a web, an operating station, a template at the station for indicating the position of inlays on the web, and means for feeding the web continuously past the station.

20. Apparatus for making inlaid linoleum, comprising means for holding a supply roll of web material, means for unwinding the web from said roll, an operating station, means separate from said unwinding means for feeding the web to said station, and a template at the station for indicating the position of inlays on the web.

21. Apparatus for making inlaid linoleum, comprising means for holding a supply roll of web material, means for unwinding the web from said roll, an operating station, a conveyor for moving the web past said station, a template at the station for indicating the position of inlays on the web, means operating in time with the conveyor for moving the template into and out of engagement with the web, and means for locking the template for movement with the conveyor while a predetermined area of the web is passing through said station.

22. In an apparatus for the placing of inlays on a web, a conveyor for moving the web, a movable frame overlying the conveyor, means for advancing the frame with the conveyor, and a template movably mounted on the frame for indicating the position of inlays on the web, and means for moving the template toward and away from the web while the frame is advancing with the conveyor.

23. In an apparatus for the placing of inlays on a web, a conveyor for moving the web, a movable frame overlying the conveyor, means for locking the frame for movement with the conveyor, and a template on the frame for indicating the position of inlays on the web.

24. In an apparatus for the placing of inlays on a web, a conveyor for moving the web, a movable frame overlying the conveyor, means for locking the frame for movement with the conveyor, means for adjusting the frame in its locked position relative to the conveyor, and a template on the frame for indicating the position of inlays on the web.

25. In an apparatus for the placing of inlays on a web, a conveyor for moving the web, a movable frame overlying the conveyor, means for advancing the frame with the conveyor, and a plurality of templates on the frame for indicating the position of inlays on the web.

26. In an apparatus for the placing of inlays on a web, a conveyor for moving the web, a movable frame overlying the conveyor, means for advancing the frame with the conveyor, and a plurality of templates movably mounted on the frame for indicating the position of inlays on the web, and means for simultaneously moving the templates toward and away from the web while the frame is advancing with the conveyor.

27. In an apparatus for the placing of inlays on a web, a conveyor for moving the web, a movable frame overlying the conveyor, means for advancing the frame with the conveyor, and a template movably mounted on the frame for indicating the position of inlays on the web, and pressure fluid actuated means for moving the template toward and away from the web while the frame is advancing with the conveyor.

28. In an apparatus for the placing of inlays on a web, a conveyor for moving the web, a movable frame overlying the conveyor, means for advancing the frame with the conveyor, and a template movably mounted on the frame for indicating the position of inlays on the web, and means controlled by the conveyor for moving the template toward and away from the web while the frame is advancing with the conveyor.

29. In an apparatus for the placing of inlays on a web, a conveyor for moving the web, a movable frame overlying the conveyor, means for advancing the frame with the conveyor, and a template movably mounted on the frame for indicating the position of inlays on the web, and pressure fluid actuated means controlled by the conveyor for moving the template toward and away from the web while the frame is advancing with the conveyor.

30. In an apparatus for the placing of inlays on a web, a conveyor for moving the web, a movable frame overlying the conveyor, a template on the frame for indicating the position of inlays on the web, a pin on the conveyor, and a pair of lugs on the frame for drivably engaging said pin, one of said lugs being yieldably mounted.

31. In an apparatus for the placing of inlays on a web, a conveyor for moving the web, a movable frame overlying the conveyor, a template on the frame for indicating the position of inlays on the web, a pin on the conveyor, a pair of lugs on the frame for drivably engaging said pin, and means for controlling the position of one of said lugs.

32. In an apparatus for the placing of inlays on a web, a conveyor for moving the web, a movable frame overlying the conveyor, a template on the frame for indicating the position of inlays on the web, a pin on the conveyor, a pair of lugs on the frame for drivably engaging said pin, and fluid actuated means for controlling the position of one of said lugs.

33. In an apparatus for the placing of inlays on a web, a conveyor for moving the web, a movable frame overlying the conveyor, a template on the frame for indicating the position of inlays on the web, a pin on the conveyor, a pair of lugs on the frame for drivably engaging said pin, one of said lugs being yieldably mounted, and means for controlling the position of the other lug.

34. In apparatus for the placing of inlays upon a web, a conveyor for moving the web, a template for indicating the position of the inlays on the web, and means providing a rigid connection between the template and conveyor for locking the same together for movement as a unit.

35. In apparatus for the placing of inlays upon a web, means for moving the web, a template for indicating the position of the inlays on the web, means for moving the template into and out of an operative position adjacent the web, and means for adjusting the template relative to the web while in said operative position.

LELAND S. ROSENER.